United States Patent [19]

Beasley

[11] 3,755,876
[45] Sept. 4, 1973

[54] METHOD AND APPARATUS FOR REPAIRING VALVE SEATS

[76] Inventor: Joseph D. Beasley, Box 33, Grand Valley, Colo. 81635

[22] Filed: July 10, 1972

[21] Appl. No.: 270,137

[52] U.S. Cl.......... 29/401, 29/156.7 A, 29/157.1 R, 29/213, 156/94, 156/95
[51] Int. Cl............................................. B23p 7/00
[58] Field of Search...................... 29/401, 156.7 A, 29/157.1 R, 213; 156/94, 95, 98, 155, 257, 258, 510, 535

[56] References Cited
UNITED STATES PATENTS

| | | | |
|---|---|---|---|
| 2,069,933 | 2/1937 | Albertson | 29/156.7 A |
| 3,142,900 | 8/1964 | Merrick | 29/401 |
| 3,146,523 | 9/1964 | Pessina | 29/401 |
| 3,347,261 | 10/1967 | Yancey | 29/157.1 R X |
| 3,660,188 | 5/1972 | Van Leer | 156/94 |

*Primary Examiner*—Charles W. Lanham
*Assistant Examiner*—D. C. Reiley, III
*Attorney*—C. B. Messenger

[57] ABSTRACT

A system and apparatus for the repair of valves that use a faucet washer for mating engagement with a seat disposed perpendicular to the axis of the valve stem wherein the washer and seat are damaged. A provided cutter that is centered with respect to the seat and/or stem cuts a torus groove in the original seat structure for the reception of a ring formed replacement seat. A bond cement that is non-soluble with respect to the fluid carried by the valve holds the replacement seat engaged in the groove, and a soluble adhesive can be used to bond the replacement ring to a replacement washer to assure correct alignment of such seat, its receiving groove and the replaced washer.

15 Claims, 5 Drawing Figures

Patented Sept. 4, 1973

3,755,876

METHOD AND APPARATUS FOR REPAIRING VALVE SEATS

BACKGROUND OF THE DISCLOSURE

Many householders and commercial establishments have considerable trouble with leaky valve washers. Today with the high cost of plumbing labor, many inexperienced maintenance workers or individuals are now concerned with the repair of leaky valves. However, maintenance personnel and especially householders as yet do not in general realize the fact that leaking valve troubles might result from a scored valve seat. Under such circumstances simple replacement of the valve washer will not correct the situation, and the valve will again be leaking a short period of time after a new washer is installed. Householders and maintenance personnel in commercial establishments are not presently equipped to reface or replace valve seats, and in fact, many users do not know that some valves now have replaceable valve seats that are separately threaded into position within the valve body. For installations where replaceable valve seats are provided, a leaking faucet problem can be corrected if the proper replacement seats are on hand, but again the ordinary householder or maintenance mechanic does not have and really cannot be expected to have a supply of all the various sizes and styles of replacement valve seats. Where different sizes and different threads are used, it is difficult to maintain or even obtain the replacement valve seats that would be required to complete valve repairs. The described situations present problems that might be best solved through provision of an universally applicable solution.

SUMMARY OF THE DISCLOSURE

The present disclosure provides a system and apparatus for the convenient repair of valve seat installations so that serviceable, efficient and economical repairs can be made by inexperienced personnel. Mainly, the disclosure is directed to the provision of a new valve seat surface within an installed valve. With the installation of such new valve seat and the further use of a new valve washer, previous leakage problems may be resolved. The valve seat replacement operations include the cutting of a torus groove in the surface previously providing the valve seat. After the groove is cut a ring element is engaged in the groove to be held therein by a bond cement that will not be attacked by the fluids carried and controlled by the valve. The replacement ring provides a new valve seat for mating engagement with a newly installed valve washer. In order to assure proper positioning and alignment of the cut groove, a cutter device is provided which incorporates guide elements for holding the cutter teeth centered with respect to the previous valve seat opening and/or with respect to the normal positioning of the valve stem. As a sale product, a replacement ring seat will be provided that is joined by a soluble adhesive directly to the replacement valve washer that is to be used. With this arrangement the actual placement of the ring seat and its adhesion in place will be accomplished when the valve stem is returned to the valve body. Alternate types of ring groove cutters may be used, and the present system and apparatus is adaptable for use in connection with the repair of valves of different design, construction, size and configuration whether such valves incorporate replaceable valve seats or not. Universal adaptability objectives are thus satisfied by the total method and apparatus herein provided.

DESCRIPTION OF THE PREFERRED EMBODIMENTS

Figure 2:
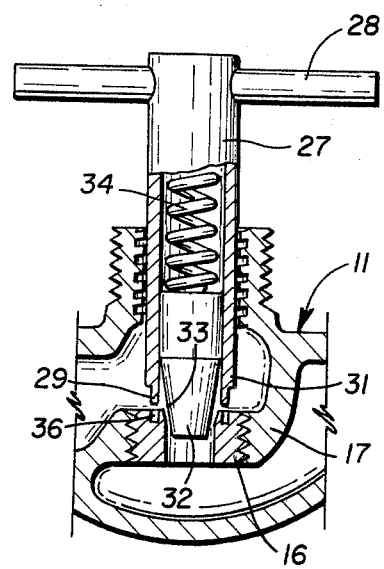
FIG. 2 is a partial cross-section showing use of a first type of ring groove cutter.
Figure 3:
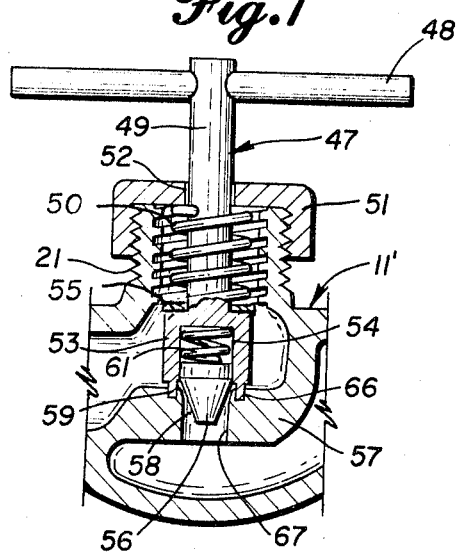
FIG. 3 is a cross-sectional elevation showing use of an alternate type of ring groove cutter in a non-replaceable seat type of valve.

Separate embodiments of the disclosure are shown in the accompanying figures with FIGS. 2 and 3 separately presenting different types of ring groove cutters. The remaining illustrations provide background for understanding the overall method and apparatus approach of the present invention.

Figure 1:
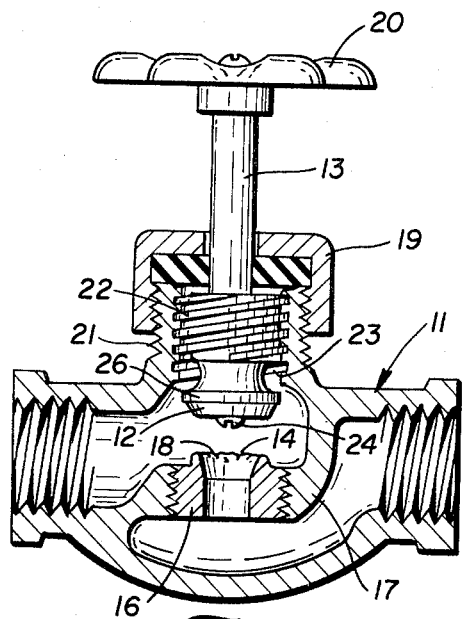
FIG. 1 is a cross-sectional elevation of an original valve of the replaceable seat type.

FIG. 1 shows a valve 11 that needs repair by reason of the fact that it has a worn washer 12 and a scored valve seat 14. The valve has a stem 13 and a replaceable type of valve seat 16 threaded in the valve body diaphragm 17. The seat 14 is scored as by the nick 18. In order to repair this type of valve 11, it is necessary to remove the valve bonnet 19 from its position of engagement with the valve body threads 21 so that turning of the stem 13 will cause the stem threads 22 to be withdrawn from the internal threads 23 in the valve body. With the stem removed the faucet washer screw 24 may be removed, and thereafter the washer 12 can be extracted from its socket receptacle 26 which is provided on the end of stem 13. Under usual circumstances only the washer 12 will be replaced when a leaky valve 11 is being repaired. For the particular valve illustrated this type of maintenance will not be adequate, since the valve seat 14 is scored at 18. Where this type of trouble is present, the newly installed replacement washer will itself become worn after a short period of useage, and the valve will again be leaking. Proper maintenance of this valve would require the removal of the replaceable seat component 16 and installation of a new seat component 16 at the same time that the valve washer is being replaced. Where the seat component 16 is replaced, a reasonable period of continued service could be expected.

As previously set forth, it is difficult to maintain an adequate stock of replacement seats on hand in order to make even routine maintenance repairs. Under emergency situations the non-availability of a replacement seat can present a substantial problem. Under other circumstances where the valve initially installed does not have a replaceable type of seat, the user or building owner is presented with an even more complicated situation. Where a non-replaceable valve seat is gouged or scored, the valve washer will have to be replaced on a continuing basis until the valve itself is replaced. To avoid these complications and to avoid the cost and inconvenience of maintaining a supply of replacement seats, the present invention provides a method and apparatus for effecting economical and speedy repairs to an installed valve.

The method to be used includes the steps of cutting a ring groove in the provided valve seat structure of size and concentric positioning adapted to receive a replacement ring-seat. Such a replacement ring-seat of proper size and round configuration is placed in the cut ring groove to be securely held therein by an adhesive that is non-soluble with respect to the fluid being carried by the piping system and valve. With the new ring-seat installed and properly adhered, the coincident installation of a new stem washer will complete a valve repair that should last for an extended period of time. Where stainless steel or other non-corroding and permanent type materials are used for the replacement ring-seat, the total repair can actually improve the quality of the valve to such extent that later maintenance activities are eliminated or minimized.

A modified procedure facilitates the installation of the ring-seat and assures the concentric placement thereof. With this procedure ring-seats are provided that are already joined to the required replacement washer by a fluid soluble adhesive. The combination ring-seat and the new replacement washer is positioned in the washer socket receptacle 26, the screw 24 is replaced, and thereafter the stem 13 will be inserted in the valve body to move the washer and ring-seat with the non-soluble adhesive already applied on the lower surface of the ring-seat into closed valve position. After the non-soluble adhesive has had time to cure, the fluid system may be turned on thus exposing the replacement washer and its soluble adhesive to the fluid. When the soluble adhesive has dissolved, the stem can thereafter be turned to open the valve thus returning the system to use.

Figure 4:
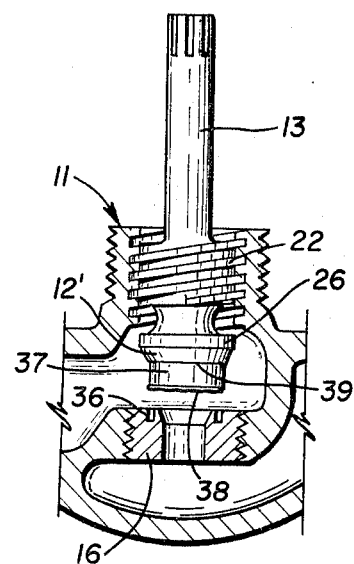
FIG. 4 is a cross-sectional elevation showing a ring-seat replacement step of such operation.
Figure 5:
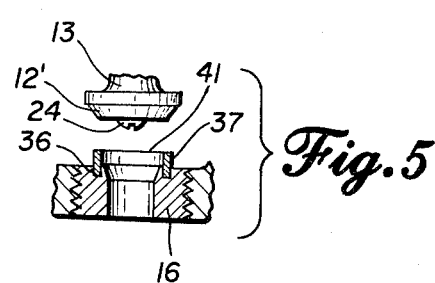
FIG. 5 is a partial cross-section showing a replacement ring-seat installed for use.

Apparatus which may be beneficially used in connection with the described system is shown in the remaining figures of the drawing. In FIG. 2 a tubular type of ring groove cutter 27 is shown. This type of cutter is essentially of hollow barrel type construction having a Tee handle drive 28 at its upper end. The barrel terminates at its lower end to provide radially disposed cutter teeth 29. The radially disposed cutter teeth 29 extend in spaced positions on the lower end of the cutter 27. A guide plunger 32 having a tapered lower surface 33 is positioned within the hollow barrel of the tube cutter 27, and it is urged downwardly and outwardly with respect thereto by a plunger spring 34. The tapered section 33 of the plunger is adapted to engage the edge walls of the passage opening through the previously provided replacement valve seat construction 16. When properly mated in such position, the cutter 27 and the cutting teeth 29 thereof will be held concentrically with respect to such passage and the originally provided seat surrounding such passage. A rotating force is applied to the cutter 27 that is resisted by the valve 11. This rotary motion will cut a torus groove 36 in the upwardly disposed surface of the seat component 16. This ring groove 36 is adapted to receive a replacement ring-seat of cylindrical construction. Such a ring-seat 37 is shown in FIG. 4 where the ring-seat is being moved toward engagement with a previously cut ring groove 36. A non-soluble adhesive 38 is applied to the ring-seat 37 and in the ring groove 36 so that the replacement ring seat will be securely held in position in the ring groove receptacle. FIG. 5 illustrates a replacement ring-seat 37 positioned and secured in a cut ring groove 36 and ready for continued useage.

FIG. 4 shows a further feature of the disclosure with the ring-seat 37 attached to a replacement washer 12', which has itself already been positioned in its socket receptacle 26 on the valve stem 13. An adhesive that is soluble with respect to the fluid that is being carried by the valve system is used to hold these elements together druing the ring-seat replacement process. This adhesive, which is applied along the line 39, will later be dissolved when the piping system is again turned on. When the soluble adhesive 39 is dissolved, the replacement ring-seat 37 will be left in position in the groove 36 to provide a new seating surface 41 within the valve body. This new seating surface will mate efficiently with the replaced washer 12' to restore the valve to nonleaking service.

A modified type of cutter 47 is shown in FIG. 3. This modified type of cutter again has a Tee handle drive 48 engaged to a stem 49. This stem is of cylindrical size corresponding to the size of the valve stem 13 initially used. An adapter bonnet 51 is provided on the stem 49 which may be threadedly engaged to the bonnet threads 21 provided by the valve 11'. The control opening 52 in this replacement bonnet 51 closely engages the stem component 49 of the cutter 47 to hold it concentrically with respect to the body 57 of the valve 11'. A cutter barrel 53 of modified size and configuration is joined to the stem component 49. This barrel 53 again has a central bore 54 that reciprocally receives a guide plunger 56. Guide plunger 56 again has a tapered section 58 which is moved into engagement with the passage 67 through the valve diaphragm 57. Cutters 59 are provided on barrel 53, and a spring 61 is used within the cutter barrel 53 to urge the plunger 56 toward its position for guiding engagement with the valve seat structure. This type of cutter is held by the plunger 56 and by its bonnet 51 and stem 47 guide system for engagement in concentric position so the ring groove 66 will be accurately cut. A spring 50 is used to urge the cutters 59 into engagement with the seat structure for cutting the groove. A regulated pressure is applied by such spring, and accordingly an accurate groove may be cut. In order to take care of instances where the height of the valve may be increased a spacer 55, or a plurality of spacers, may be interposed between the spring 50 and the barrel 53 in order to maintain the desired cutting pressure. These spacers could likewise be positioned between the spring 50 and the bonnet component 51. Valve 11' does not have a replacement type seat, and the original seat is simply provided by a raised section on the diaphragm 57 surrounding the valve passage 67.

The remaining steps in the repair of this type of valve are similar to those previously described. A replacement ring-seat 37 is positioned and adhesively secured in the cut groove 66 to provide a new valve seat surface that may be engaged by a newly replaced washer 12'. When the cutter and replacement ring-seat components are used for the repair of this type of valve, an increased utility and economy may be realized, inasmuch as it might previously have been necessary to replace the entire valve in order to accomplish a good and serviceable repair.

Practice of this disclosure with either type of cutter provides a repair that is serviceable, efficient and quick. Where a stainless steel or other durable metal ring-seat is used the new seat will have an increased service life when compared to the originally provided seat.

The replacement ring type of seat used herein is also a substantial improvement over the seats that are now provided by cutting, burnishing and grinding types of tools that are now proposed for plumber use when redressing originally provided valve seat structures.

I claim

1. A method for the repair of the damaged valve seat of valves wherein the seat surrounds a flow opening and is disposed perpendicular to the axis of the bonnet guided stem for such valve comprising the steps of removing the valve stem and washer, cutting a torus groove in the structure providing the original valve seat utilizing a cutter centered with respect to said flow opening, providing and inserting a ring structure in said torus groove with a flat surface of said ring exposed above the groove to provide a replacement valve seat structure, and adhesively cementing said ring in place in said groove.

2. The method as set forth in claim 1 wherein the exposed face of said replacement ring-seat is positioned perpendicularly with respect to the stem of said valve.

3. The method as set forth in claim 1 wherein said cutter is further centered with respect to the original valve stem location.

4. The method as set forth in claim 3 wherein a bonnet component is applied to the valve body to provide additional centering for said cutter.

5. The method as set forth in claim 1 and further comprising the additional step wherein a replacement washer is applied to said valve stem.

6. The method as set forth in claim 5 wherein the replacement ring and replacement washer are adhered each to each utilizing an adhesive that is soluble with respect to the fluid being carried by the valve.

7. The method as set forth in claim 6 wherein the replacement ring and washer are applied to the valve stem for reinsertion into the valve body to assure proper alignment of all components as the replacement ring is moved into the cut torus groove.

8. The method as set forth in claim 7 inclusive of the further step of applying an adhesive that is non-soluble with respect to the fluid being carried by the valve to the lower face of the replacement ring structure for adhesively joining said ring in said groove.

9. Apparatus for the replacement of damaged valve seats and washers in valves wherein the original seat surrounds a centrally disposed flow passage that is aligned with the axis of the stem for said valve comprising a hollow cutter for insertion into said valve, tapered guide means for reciprocal engagement within said cutter and adapted for engagement in the flow passage of said valve for centering said cutter with respect thereto, cutter elements on said cutter for cutting a torus groove in the valve structure originally providing the valve seat, means for inserting and placing a ring formed replacement seat in said groove, said ring being secured and held in place so that an exposed face thereof defines a new seat for said valve.

10. Apparatus as set forth in claim 9 wherein said cutter is cylindrical with a cooperatively formed guide means, and additionally comprising a resilient element for urging said guide outwardly toward engagement with said flow passage.

11. Apparatus as set forth in claim 9 and further comprising a bonnet guide element for engagement with said valve body and providing additional guide means for said cutter.

12. Apparatus as set forth in claim 9 wherein said ring formed seat is of height slightly greater than the depth of said groove whereby the thus exposed face provides the replacement seat for said valve.

13. Apparatus as set forth in claim 9 wherein an adhesive cement that is non-soluble with respect to the fluid carried by said valve is used to secure and hold the replacement ring-seat in place.

14. Apparatus as set forth in claim 13 wherein a replacement washer is used in said with, with washer and ring-seat being provided as a unitary component to facilitate said inserting and placing within said valve.

15. Apparatus as set forth in claim 14 wherein an adhesive that is soluble with respect to the fluid that is carried by the valve is used to join the washer and the replacement ring-seat together prior to said inserting and placing.

* * * * *